July 14, 1936.                J. D. KNEPP                2,047,876
                         MILK STRAINER HOLDER
                         Filed Nov. 12, 1935
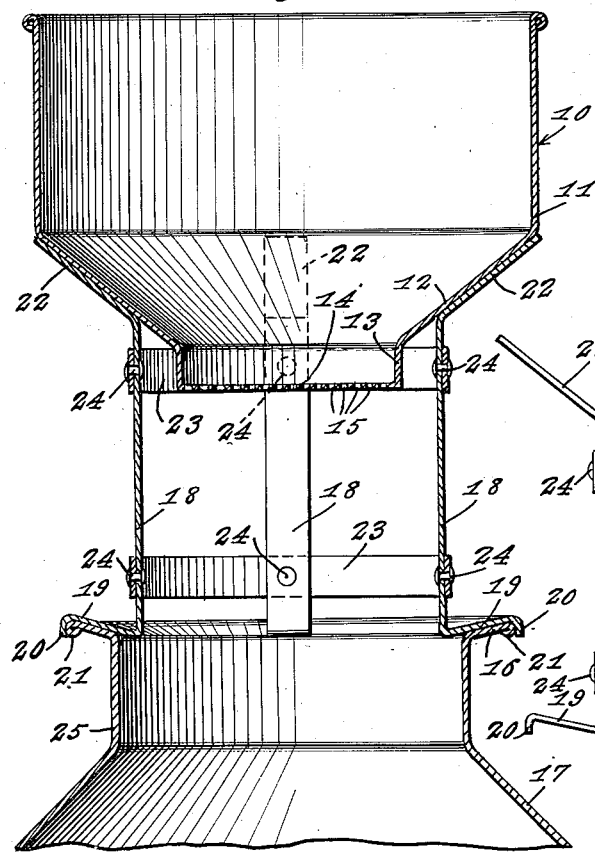
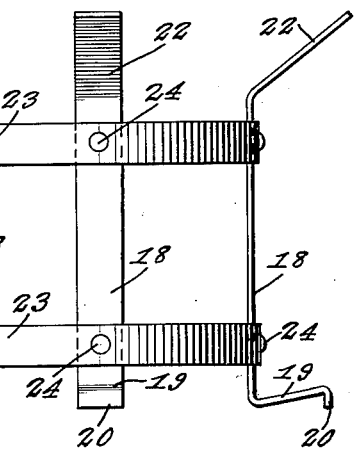
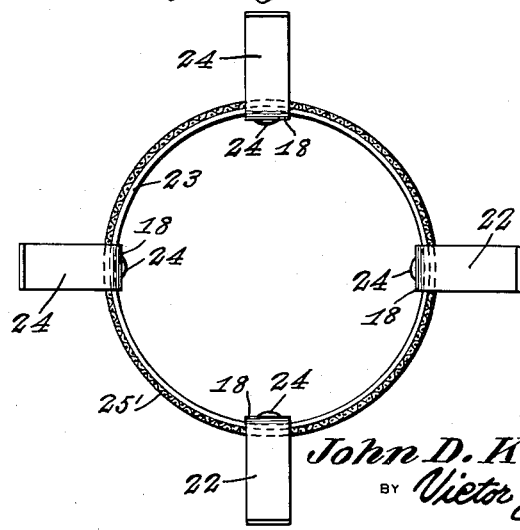
John D. Knepp, INVENTOR
BY Victor J. Evans & Co.
ATTORNEY Patented July 14, 1936

2,047,876

UNITED STATES PATENT OFFICE 2,047,876

MILK STRAINER HOLDER

John D. Knepp, Nook, Pa.

Application November 12, 1935, Serial No. 49,428

3 Claims. (Cl. 248—94)

This invention relates to milk strainer holders. In inspecting milk areas strainers of required type are used and these strainers have small holes in the bottom through which the milk flows in small streams.

An object of the present invention is to provide a holder for elevating the strainer above the top of the milk can to permit a circulation of air around the streams to remove odors and heat from the milk before it enters the milk can.

A further object is to provide a milk strainer holder which will include upright side bars shaped at the ends to receive the strainer and the rim of the milk can, and connected together by spaced annular rings which reinforce the side bars against being deformed adjacent to the strainer and the milk can whereby vibration of the holder will be reduced and danger of collapse of the holder under the weight of a full strainer will be positively eliminated.

A further object is to provide a holder which will be formed of a few strong, durable and inexpensive parts, which will be light in weight and easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view through a milk can holder constructed in accordance with the invention and showing the holder in applied position.

Figure 2 is a front elevation of the holder.

Figure 3 is a plan view of a modified form of the invention.

Referring now to the drawing in which like characters of reference designate similar parts in the various views, 10 designates a milk strainer of conventional type having a cylindrical side wall 11, an inverted frusto-conical bottom 12, a cylindrical spout 13, extending below the bottom, and a screen 14 in the mouth of the spout, the screen having a plurality of small openings 15 through which the milk flows in small separated streams.

For supporting the milk strainer upon the rim 16 of a conventional milk can 17, I provide a holder comprising a plurality of side bars 18 preferably formed of strap metal and preferably four in number. The bottom of each bar is bent outwardly and bent obliquely upwardly to provide a foot 19 which is adapted to be supported upon and conform to the contour of the rim 16 of the milk can. The outer end of the foot terminates in a downwardly extending hook 20 which engages over the bead 21 of the milk can rim.

The upper end of each side bar is directed obliquely outwardly and upwardly to provide a supporting arm 22 adapted to engage the frusto-conical bottom 12 of the strainer and conform to the slope of said bottom as best shown in Figure 1.

The side bars 18 are connected by rings 23 also preferably formed of strap metal and these rings are riveted as shown at 24 or otherwise rigidly secured to the side bars. Preferably two rings are employed, the upper ring being disposed adjacent to the supporting arms 22 at the upper ends of the side bars, and the lower ring being disposed adjacent to the feet 19 at the lower ends of the side bars. These rings reinforce and strengthen the side bars against spreading apart or buckling under the weight of a full strainer. These rings are of smaller diameter than the neck 25 of the milk can and are also of larger diameter than the spout 13 of the strainer so that the side bars 18 will be disposed in upright position inwardly of the rim of the milk can and thus the weight of the full strainer will have a tendency to cause the feet 19 to engage the rim 16 of the milk can with considerable pressure which would not be the case if the side bars rested directly upon the rim.

The holder may be formed if desired of round material rather than strap metal and may be of the open or skeleton type illustrated or may be covered on the outside with wire screen 25', as shown in Figure 3, where health laws or regulations object to an open type holder.

In operation the holder elevates the strainer considerably above the top of the milk can so that air may circulate around the small streams of milk gravitating into the can and lower the temperature and remove odors from the streams. The contents of the can may be viewed through the skeleton holder so that the can will not be filled to overflowing.

From the above description it is thought that the construction and operation of the invention will be fully understood without further explanation.

What is claimed is:

1. A milk can holder comprising a plurality of upright side bars, feet at the lower ends of the side bars adapted to engage the rim of a milk can, outwardly and upwardly extending supporting arms on the upper ends of the side bars adapted to conform to the contour of the frusto-conical bottom of a milk strainer, and superposed rings fixed to the side bars, the uppermost ring being disposed adjacent to the supporting arms, and the lowermost ring being disposed adjacent to the feet whereby the side bars are reinforced against distortion under the weight of a full strainer.

2. A milk can holder comprising a plurality of upstanding side bars, the lower ends of the bars being directed upwardly and outwardly and terminating in hooks to conform to the contour of the rim and bead of a milk can, the upper ends of the bars being directed obliquely upwardly and outwardly to provide supporting arms adapted to conform to the contour of the frusto-conical bottom of a milk strainer, and superposed rings fixed to the bars, one of the rings being disposed adjacent to the supporting arms, and the other ring being disposed adjacent to the lower ends of the bars, said rings being of less diameter than the mouth of a conventional milk can whereby the weight of a full milk strainer is disposed inwardly of the rim of the milk can and the upwardly and outwardly inclined ends of said bars made to hug the milk can rim with considerable pressure.

3. A milk can holder including a plurality of upright side bars, upwardly and outwardly directed feet on the lower ends of the bars terminating in hooks adapted to engage the rim and bead of a conventional milk can top, supporting arms on the upper ends of the side bars directed upwardly and outwardly to conform to the frusto-conical bottom of a conventional milk can strainer, superposed rings riveted to the side bars to reinforce the side bars against being deformed under the weight of a full strainer, and a wire mesh screen covering the side bars.

JOHN D. KNEPP.